United States Patent [19]

Jacquelin

[11] 4,097,357
[45] Jun. 27, 1978

[54] METHOD AND DEVICE FOR REGENERATING ZINC

[75] Inventor: Jean Jacquelin, Marolles en Hurepoix, France

[73] Assignee: Compagnie Generale d'Electricite S.A., Paris Cedex, France

[21] Appl. No.: 707,732

[22] Filed: Jul. 21, 1976

[30] Foreign Application Priority Data

| Jul. 21, 1975 | France | 75 22661 |
| Dec. 3, 1975 | France | 75 36967 |
| Jun. 3, 1976 | France | 76 16842 |
| Jun. 3, 1976 | France | 76 16843 |
| Jun. 9, 1976 | France | 76 17455 |

[51] Int. Cl.² .......................... C25C 1/16; C25C 7/02
[52] U.S. Cl. .................. 204/252; 204/55 R; 204/272; 204/289; 204/290 F; 204/114
[58] Field of Search ................ 204/55 R, 114, 234, 204/237, 273, 269, 275, 252, 263, 290 R, 288, 289, 272, 290 F

[56] References Cited

U.S. PATENT DOCUMENTS

| 701,215 | 5/1902 | Mond | 204/55 R X |
| 1,056,118 | 3/1913 | Paulin | 204/55 R |
| 1,255,433 | 2/1918 | Laist et al. | 204/55 R X |
| 3,326,783 | 6/1967 | Winter | 204/55 R X |
| 3,483,568 | 12/1969 | Andersen et al. | 204/237 X |
| 3,547,801 | 12/1970 | Paine | 204/149 |
| 3,728,244 | 4/1973 | Cooley | 204/269 |
| 3,751,351 | 8/1973 | Zankowski | 204/273 X |
| 3,957,599 | 5/1976 | Lindsay et al. | 204/269 X |
| 3,985,581 | 10/1976 | Stachurski et al. | 204/273 X |
| 4,001,102 | 1/1977 | Batha et al. | 204/180 R X |

*Primary Examiner*—Arthur C. Prescott
*Attorney, Agent, or Firm*—Sughrue, Rothwell, Mion, Zinn and Macpeak

[57] ABSTRACT

The invention relates to a method and device for regenerating zinc from an alkaline zincate solution. To this end, the solution is contacted with two electrodes under tension, so that zinc is deposited on the negative electrode and oxygen is evolved at the positive electrode, the solution being conveyed at a sufficient speed for the zinc to be deposited and then detached from the electrode. In an alternative embodiment, during a first period, the solution is conveyed at a low or zero speed so that the zinc can be deposited, and is then conveyed at a higher speed so as to detach the zinc particles. The negative electrode is preferably made of magnesium and can be a cylindrical bar or inter alia can be formed with projections. The invention is applicable to electric vehicles.

22 Claims, 21 Drawing Figures

METHOD AND DEVICE FOR REGENERATING ZINC

BACKGROUND OF THE INVENTION

1. Field of the Invention

The invention relates to a method and device for regenerating zinc from an alkaline zincate solution coming inter alia from an electrochemical generator.

2. Description of the Prior Art

To summarize the prior art, in zinc-air electrochemical generators a suspension of powdered zinc in potash is oxidised by atmospheric oxygen, thus forming zincates which are soluble in potash and producing an electromotive force. It is thus desirable to regenerate the zinc from the solution of zincates, so that the metal can be re-used in the generator.

It is known that powdered zinc can be regenerated electrochemically, more particularly by electrolysis of an aforementioned alkaline zincate solution. Such methods, however, have a number of disadvantages. More particularly, it is frequently found that the zinc obtained in this manner is deposited at the cathode in the form of a foam or heterogeneous adhesive layer which is very difficult to detach from the cathode so that the material can be re-used.

Of course, this problem can be solved by mechanical scraping methods, but these methods are subject to practical difficulties, particularly in the case of small regenerators.

The invention, which aims to obviate these disadvantages, relates to a method and device whereby zinc in the form of directly-usable particles can be very easily regenerated from an alkaline zincate solution, the method being very simple, yielding a maximum output and requiring minimum consumption of energy.

SUMMARY OF THE INVENTION

The present invention provides a method of regenerating zinc from an alkaline zincate solution, wherein the solution is contacted with at least two electrodes connected to a d.c. generator so that zinc particles are deposited on the negative electrode and oxygen is evolved at the positive electrode, the said solution being conveyed at a speed sufficiently high for the zinc particles to be dissociated from the negative electrode during at least a part of the operation of the method.

Accordingly, the invention relates to a method which, in a first embodiment, comprises contacting an alkaline zincate solution with at least two electrodes connected to a d.c. voltage generator so that zinc particles are deposited on the negative electrode and oxygen is evolved at the positive electrode, the method being characterised in that the solution is conveyed at a sufficiently high speed relative to the electrodes for the zinc particles to be successively deposited, detached from the negative electrode and entrained at the same rate as they are formed.

In a second embodiment, the method according to the invention comprises contacting an alkaline zincate with at least two electrodes connected to a d.c. voltage generator so that zinc particles are deposited at the negative electrode and oxygen is evolved at the positive electrode, the method being characterised in that, in a first period, the solution is conveyed at a sufficiently low speed relative to the electrodes (or at zero speed) so that the zinc particles are deposited on the negative electrode after which, in a second period, the solution is conveyed at a sufficiently high speed for the previously-deposited zinc particles to be detached from the negative electrode, and so on.

The invention also relates to a device for working the method, characterised in that it comprises a negative electrode disposed substantially along the axis of a tubular duct in which the solution for regeneration is conveyed, the duct being constructed from an insulating hydrophilic material such as asbestos, such that the alkaline solution can infiltrate but zinc particles dissociated from the negative electrode cannot pass through it; a positive electrode disposed in the form of a layer on the outer surface of the tubular duct, the positive electrode being constructed from a porous conductive material containing inter alia nickel and such that oxygen is released to the exterior; and a layer of a porous water-repellent material containing inter alia sintered polytetrafluoroethylene disposed on the positive electrode, the water-repellent material likewise being such that oxygen is released to the exterior but the solution cannot seep through.

An embodiment of the device for working the method is characterised in that it comprises a negative electrode disposed substantially along the axis of a tubular duct in which the solution for regeneration is conveyed, the duct being constructed from an insulating hydrophilic material such as asbestos, such that the alkaline solution can infiltrate but zinc particles dissociated from the negative electrode cannot pass through it; a positive electrode disposed in the form of a layer on the outer surface of the tubular duct, the positive electrode being constructed from a porous conductive material containing inter alia nickel and such that oxygen is released to the exterior; and a layer of a porous water-repellent material containing inter alia sintered polytetrefluoroethylene disposed on the positive electrode, the water-repellent material likewise being such that oxygen is released to the exterior but the solution cannot seep through.

Other features and advantages of the invention will be clear from the following non-limitative description, which is given by way of example for illustrative purposes only, with reference to the accompanying drawings with like elements bearing like numerical designations.

DESCRIPTION OF THE PREFERRED EMBODIMENTS

Figure 1:
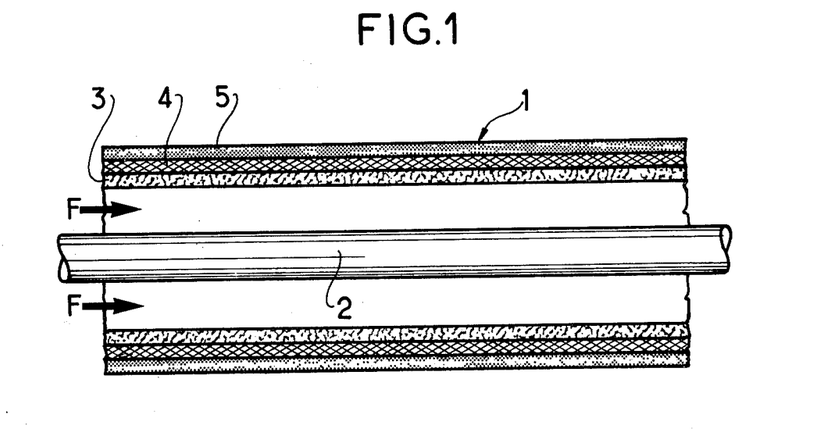
FIG. 1 is a sectional view of one a device for regenerating zinc according to the invention.

FIG. 1 shows a zinc-regenerating device according to the invention bearing the general reference 1 and comprising the following, from the interior outwards: A negative electrode 2 in the form of a cylindrical bar disposed at the centre of a tubular duct 3 made of a porous insulating hydrophilic material such as asbestos, the rigidity of which can be improved by a suitable mechanical holder (not shown). A solution of zincate in potash (together with regenerated zinc) flows in duct 3 as shown by arrows F. The porous insulating hydrophilic substance allows the potash solution to filter through to a positive electrode 4 disposed on the asbestos layer but prevents particles of regenerated zinc from coming in contact with electrode 4 and being oxidized thereby. Electrode 4 comprises a porous metal layer, e.g. of nickel or sintered nickel, supported if required by a fabric or perforated plate so that oxygen resulting from the process is freely released towards the exterior.

A porous water-repellent layer 5, e.g. of sintered polytetrafluoroethylene, is disposed on electrode 4. The layer is adapted to allow oxygen to flow through but prevent the potash solution from seeping towards the exterior.

The method according to the invention can be explained as follows:

When a d.c. is applied to the terminals of electrodes 2 and 4, the alkaline zincate solution is electrolyzed and the zinc is deposited in the form of dendritic particles on electrode 2, whereas oxygen is evolved at electrode 4 and discharged to the exterior, as already stated.

In a first embodiment of a method according to the invention, the flow speed of zincate solution F is sufficiently high to detach the dendritic particles from electrode 2 and thus prevent the particles from becoming excessively large before being entrained by the solution.

In a second embodiment of the method, the zinc is deposited for sufficient time to form dendrites and is then detached from electrode 2. To this end, the flow speed of electrolyte is slow or zero during the deposition period but high for a short period so as to detach the dendritic particles from electrode 2.

This sequence can, of course, be periodically repeated. An advantage of the second embodiment is that it reduces the power required by the pump for circulating the solution and also helps to obtain a nickel deposit which does not adhere firmly to electrode 2 and can therefore easily be detached.

Advantageously, irrespective of the embodiment, the zinc deposition electrode 2 is only slightly adhesive, so that the resulting particles can be detached by a flow of liquid (which of course is much less efficient than mechanical scraping).

To this end, according to the invention, the electrode 2 is advantageously made of a material having a strong excess pressure of hydrogen, e.g. a magnesium-based material. Of course, this material must not form intermetallic compounds with zinc, and therefore should not contain inclusions of elements such as copper, nickel, iron or zinc.

Advantageously, also the surface of electrode 2 is polished. Preferably, the surface is also partitioned or divided into metal regions and insulating regions.

Partitioning on a microscopic scale can be produced, e.g. by covering the metal surface with a layer of insulating oxide and cracking or splitting it by heat-treatment. The dendrites are deposited on the cracks; they have very small, highly fragile bases, so that they can be detached more easily.

Alternatively, the partitioning can be on the macroscopic scale. For this purpose, grooves or scratches are formed on the surface of electrode 2 and filled with an insulating material such as an epoxy resin. Next, the electrode is polished, thus showing up a number of small metal areas separated by the insulating material. In this case the dendrites are deposited on the metal surfaces and, as before, can easily be detached from electrode 2. In this case it is not necessary to avoid inclusions in the negative electrode of metals which form intermetallic compounds with zinc.

Figure 2:
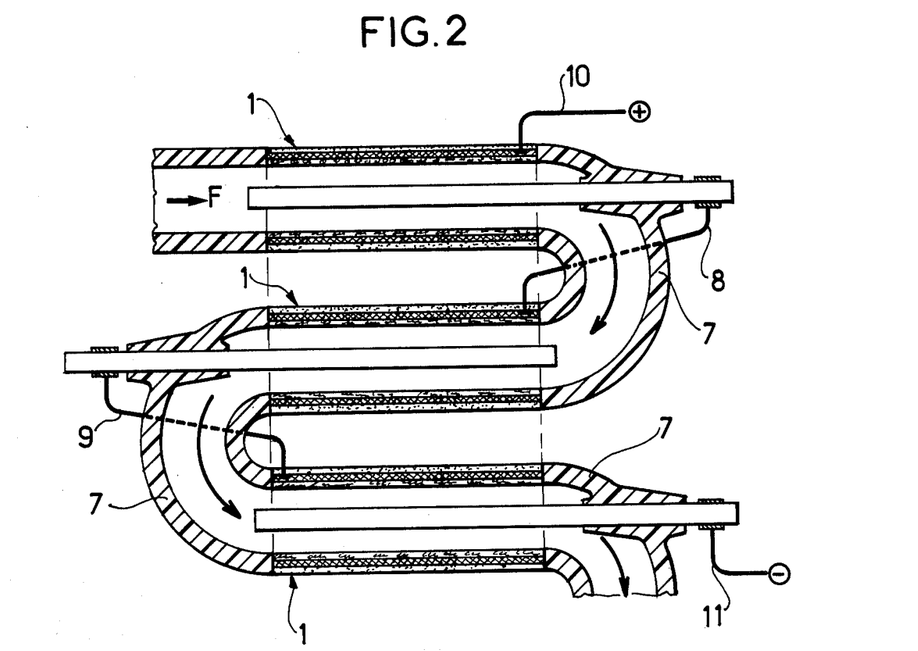
FIG. 2 is a sectional view of one example of an installation for regenerating zinc according to the invention.

FIG. 2, by way of example, shows a zinc-regenerating insulation comprising a number of devices or cells 1 as shown in FIG. 1 but connected in hydraulic series by sleeves or bent insulating members 7 and electrically connected in series by connections 8 and 9, the d.c. being applied via connections 10 and 11, assuming that the stall comprises only three cells 1.

Figure 3A:
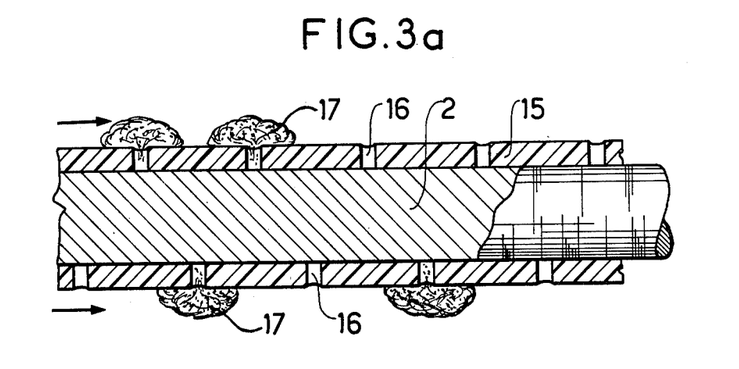
FIGS. 3a, 3b are sectional and side elevational views, respectively, of a first embodiment of the device according to the invention.
Figure 3B:
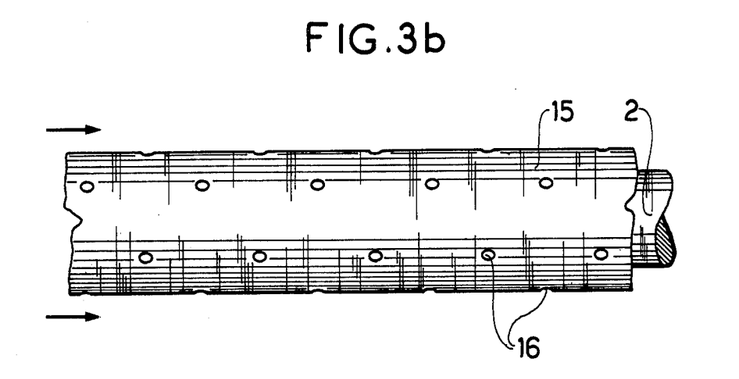

In FIGS. 3a and 3b, which are a cross-section and an external view respectively of an embodiment of the negative electrode 2, the metal surface is covered with an insulating layer 15 formed on each side with small apertures 16 which are advantageously in staggered relationship.

Consequently, the zinc dendrites form in apertures 16 and spread out as shown at 17 in FIG. 3a, i.e they have a thin base in apertures 16 terminating in a large external spread-out portion as shown. This spread results in a high shearing force at their base and facilitates detachment from the electrode by the flow of solution. Furthermore, the force required for detaching the dendrites is greatly reduced, resulting in low energy consumption by the pump conveying the solution.

Figure 4A:
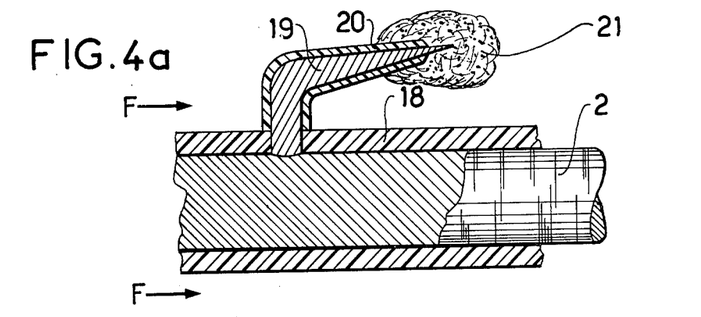
FIGS. 4a, 4b are sectional and elevational views respectively of another embodiment of the device according to the invention.
Figure 4B:
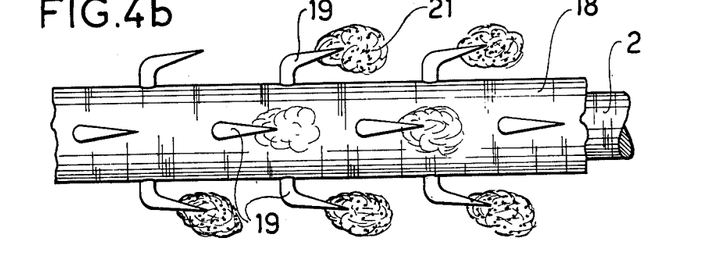

In the embodiment shown in FIGS. 4a and 4b, electrode 2 is as before covered by an insulating layer 18.

In FIG. 4a, the electrode has a metal core formed with projections, e.g. cylindrical metal projections 19 terminating in a tip and covered, except for the tip, with an insulating layer 20 of the same kind as layer 18. As can be seen, the tips of projections 19 extend parallel to one another and in the same direction as the flow of solution indicated by arrows F. Of course, as shown in FIG. 4b, the projections 19 are disposed in staggered relationship on electrode 2.

As the drawings show, the zinc dendrites spread outside the projections, as shown at 21.

Note that in this embodiment, detachment of dendrites 21 by the flow of solution F is further facilitated because the surface area with which the dendrites oppose the flow of the solution is large in relation to their base area.

Figure 5:
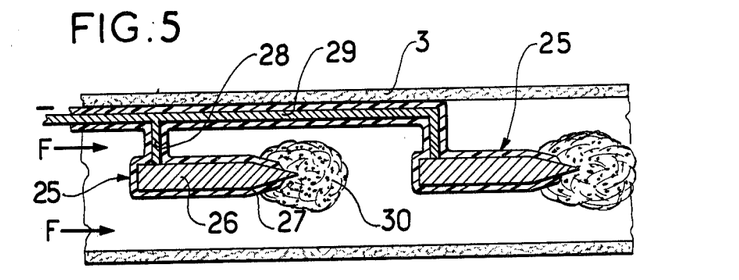
FIG. 5 is a sectional view of another embodiment of the device according to the invention.

In the embodiment shown in FIG. 5, electrode 2 is divided into elements 25 disposed along the axis of the tubular duct 3. Each element has an e.g. cylindrical metal core 26 ending in a conical tip and covered, except at the end of the tip, with an insulating layer 27. The metal core 26 is secured to an electric conductor 28 which is also insulated and is connected to an insulated cable 29 disposed against the wall of duct 3. The cable is connected to the negative terminal of a generator supplying the regenerating device. As before, the conical tips extend parallel to one another and in the same direction as the flow of solution F.

Of course, the zinc dendrites 30 spreading at the end of elements 25 are fewer in number than in the preceding cases but have a large volume and are very easily detached by the flow F of solution.

Figure 6:
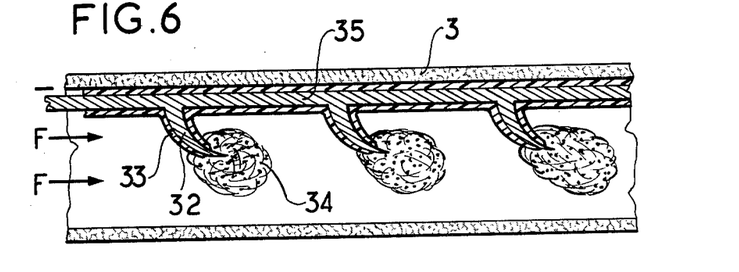
FIG. 6 is a sectional view of still another embodiment of the device according to the invention.

FIG. 6 shows another embodiment, in which electrode 2 comprises a number of metal projections 32 terminating in tips along the axis of the ducts and covered, except for the tip, with an insulating layer 33. The tips extend parallel to one another and in the same direction as the flow of solution F. The tips are secured to a seat 35 which is likewise insulated and disposed against the wall of duct 3. Thus, the zinc dendrites spread out at the ends of the tips, as shown at 34.

Figure 7:
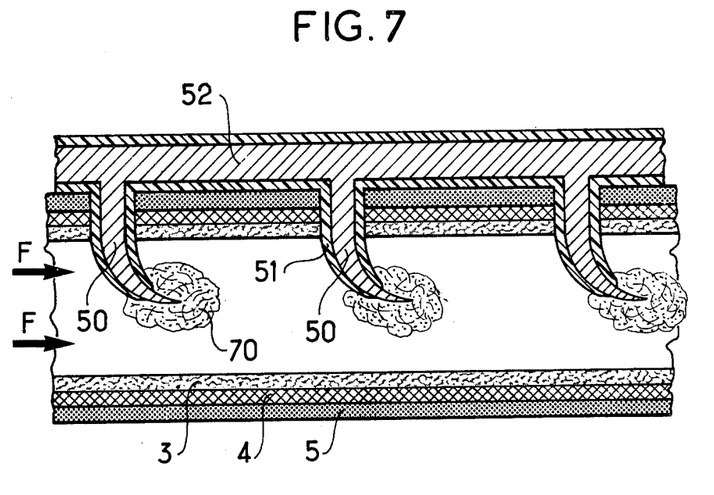
FIG. 7 is a sectional view of another embodiment of the device according to the invention.

In the embodiment shown in FIG. 7, the zinc-regenerating device comprises a negative electrode formed with projections 50 disposed at the centre of the tubular duct 3. Projections 50 (which are e.g. cylindrical and made of a metal, inter alia magnesium) terminate in tips disposed along the axis of the duct and are covered, except for the tip, with an insulating layer 51. The tips are connected to a seat 52 which is likewise insulated and disposed inside the tube, i.e. on the water-repellent layer 5.

Zinc is deposited in the form of dendritic particles on the tips of the projections, as shown at 70, whereas oxygen is evolved at electrode 4 and discharged to the exterior.

It has also been assumed that the metal projections 50 terminate in a tapering tip. In some cases, however, the applicants have found that detachment of the dendrites by the flow of solution is facilitated if the ends are not tapering but flat or substantially flat, mainly because they do not adhere firmly to flat ends, where the solution is less turbulent.

Figure 8:
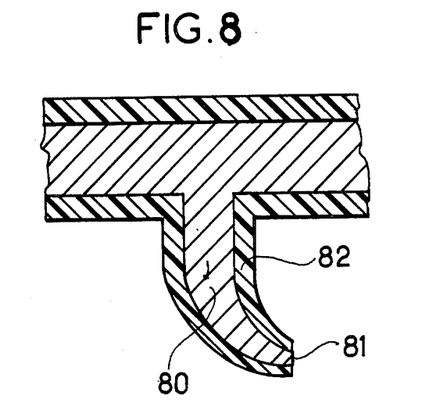
FIG. 8 is an enlarged sectional view of a portion of still another embodiment of the device according to the invention.

Consequently, in a variant as illustrated in FIG. 8, projections 80 are provided with flat ends 81 and the insulating agent 82 covers the entire projection except for tip ends 81, all the other features remaining unchanged. Of course, this variant is applicable to all embodiments of the invention.

Figure 9:
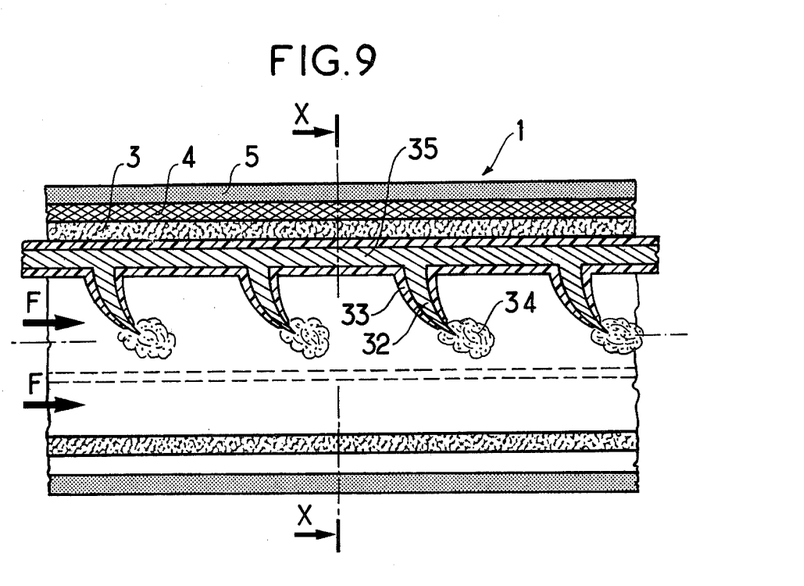
FIG. 9 is a sectional view of another embodiment of the device according to the invention.
Figure 10:
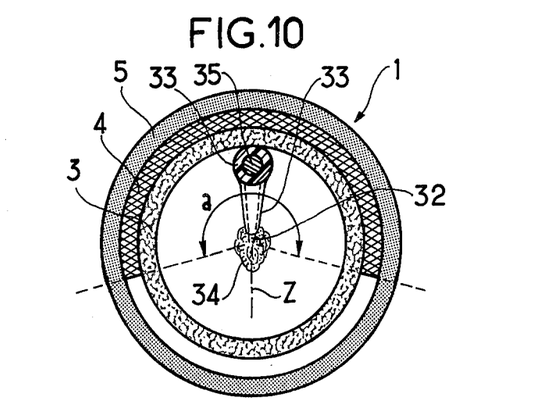
FIG. 10 is a cross-section along line XX in FIG. 9.

FIGS. 9 and 10 show a zinc-regenerating device according to the invention comprising a tubular duct 3. The negative electrode comprises a number of metal projections 32 terminating in tips aligned along the duct axis and covered, except for the tips, with an insulating layer 33, like those shown in FIG. 5. The projections extend parallel to one another and in the same direction as the flow F of solution. The projections are secured to a seat, likewise insulated, disposed against the wall of duct 3 as previously mentioned.

It can be seen with reference to FIG. 10, showing the same embodiment, that only the duct 3 and the layer 5 have completely circular cross-sections. The positive electrode 4 has a partially circular cross-section, i.e. in the form of circles bounded by a centre angle $a$ of at least 180°, the bisector Z of the angle being substantially vertical.

Any particles of zinc not entrained by the flow of solution collect by gravity at the bottom and cannot under any circumstances come in contact with electrode 4 and cause short-circuits.

Figure 11:
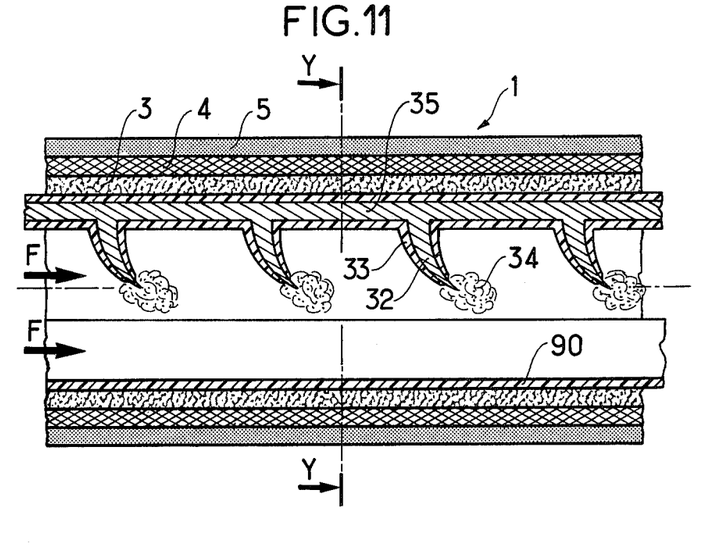
FIG. 11 is a sectional view of another embodiment of the device according to the invention.
Figure 12:
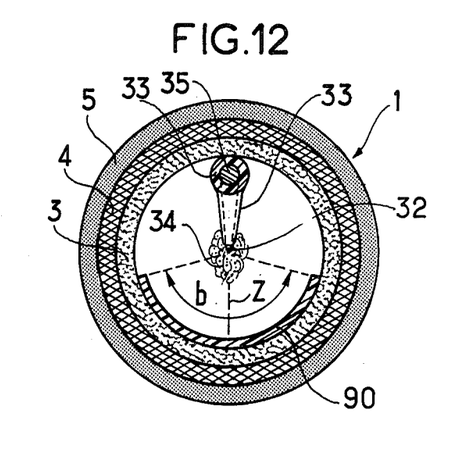
FIG. 12 is a cross-section along line YY in FIG. 11.

FIGS. 11 and 12 show a further embodiment of the invention. In these drawings, duct 3, electrode 4 and water-repellent layer 5 all have a complete circular cross-section. However, a layer 90 of fluid-tight insulating material is deposited inside the duct 3 and has a cross-section in the form of an arc of a circle bounded by a centre angle $b$ not greater than 180°, the bisector Z of angle $b$ being substantially vertical.

This embodiment like the previous one, can prevent any disadvantageous effects of zinc particles which are not entrained by the flow of solution.

Figure 13:
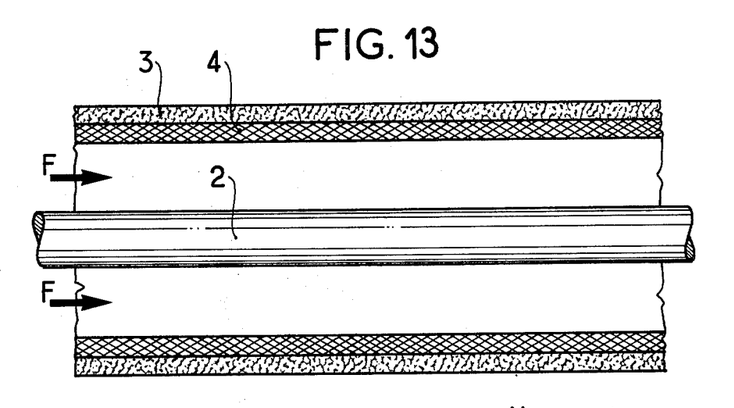
FIG. 13 is a sectional view of another embodiment of the device for regenerating zinc according to the invention.

In FIG. 13 a device for regenerating zinc according to the invention comprises a negative electrode 2 disposed at the centre of a tubular duct 3 made of a fluid-tight insulating material. On the inner surface of the duct 3 there is a positive electrode 4 in contact with a solution of zincate in potash (together with regenerated zinc) flowing in the direction of arrows F. The electrode 4 comprises a porous metal layer, e.g. nickel or sintered nickel, supported, if necessary, by fabric or perforated plate. Naturally, the oxygen which is evolved is entrained by the flow of the solution and may be separated therefrom by any suitable known device (not shown). This is also true of the further embodiments described below.

Figure 14:
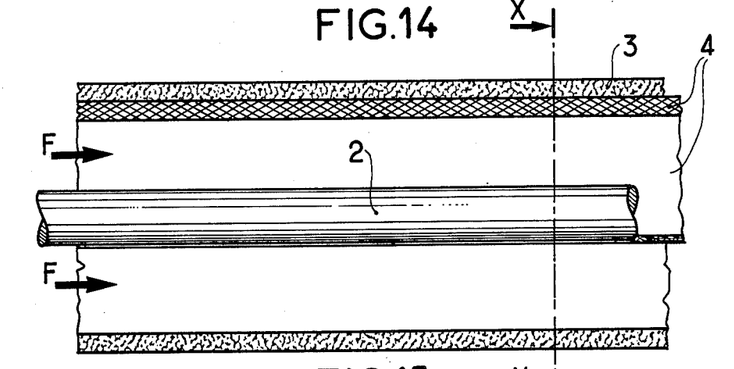
FIG. 14 is a sectional view of another embodiment of the device according to the invention.
Figure 15:
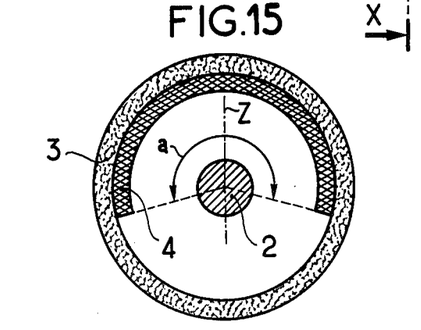
FIG. 15 is a cross-section along a line XX in FIG. 14.

In the embodiment of FIGS. 14 and 15, only the duct 3 has a complete circular cross-section, the positive electrode 4 having a cross-section in the form of an arc of a circle bounded by a centre angle $a$ of at least 180° with a bisector Z which is substantially vertical.

It can thus be seen that any zinc particles not entrained by the flow of the solution collect by gravity at the bottom and cannot under any circumstances come in contact with the electrode 4 and cause short circuits which could noticably disturb the regeneration process.

Figure 16:
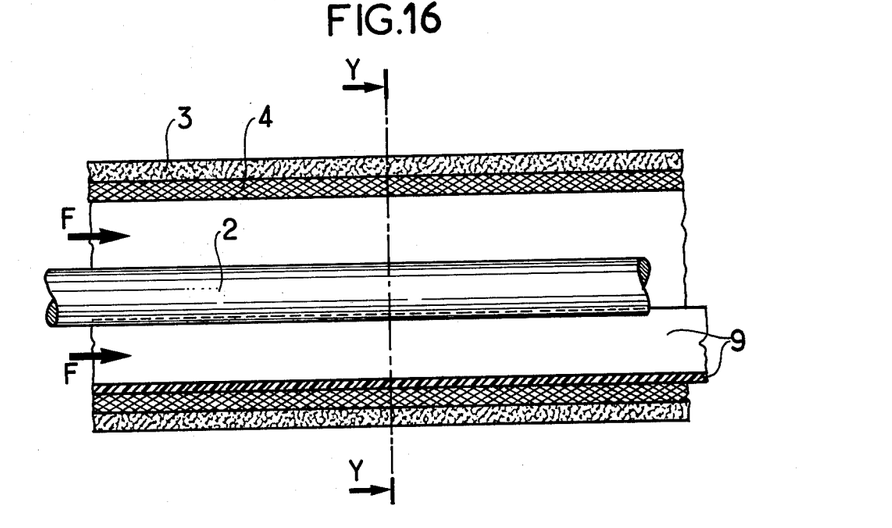
FIG. 16 is a sectional view of another embodiment of the said device according to the invention.
Figure 17:
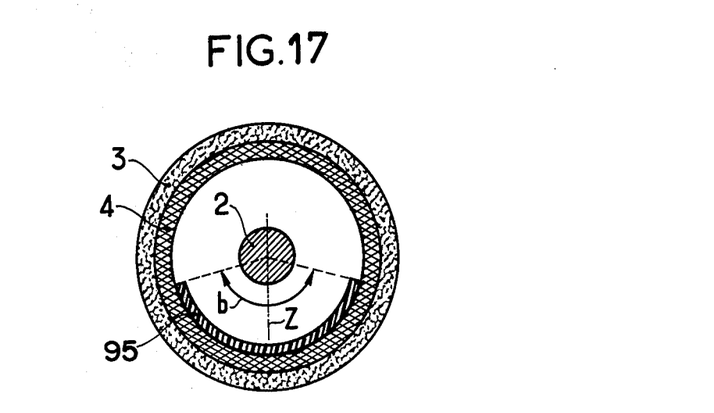
FIG. 17 is a cross-section along a line YY in FIG. 16.

In the embodiment of FIGS. 16 and 17 the duct 3 and the positive electrode 4 both have cross-sections in the form of complete circles. However, a layer 95 of fluid-tight insulating material is deposited inside the duct 3 and has a cross-section in the form of an arc of a circle bounded by a centre angle $b$ not greater than 180°, with a bisector Z which is substantially vertical.

This embodiment like the previous one can prevent any disadvantageous effects of zinc particles which are not entrained by the flow of solution.

Figure 18:
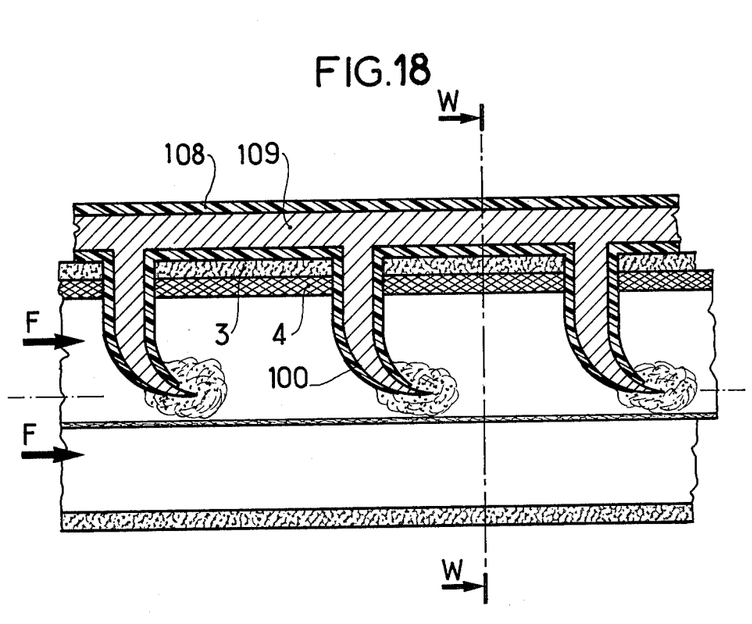
FIG. 18 is a sectional view of yet another embodiment of the said device according to the invention.
Figure 19:
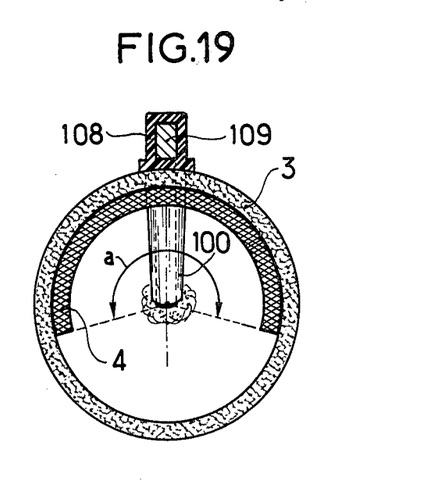
FIG. 19 is a cross-section along a line WW in FIG. 18.

According to FIGS. 18 and 19 another embodiment comprises a negative electrode in the form of projections 100 passing from the exterior to the interior of a fluid-tight insulating duct 3. The projections 100 lie along the axis of the duct 3 and a positive electrode 4 is disposed on the inside of the duct 3 and extends over a centre angle $a$ of at least 180° as in the case of FIGS. 14 and 15. A solution of zincate in potash (together with regenerated zinc) flows along the duct in the direction of the arrows F.

The projections 100 are cylindrical and made of metal (preferably magnesium) and terminate in tips disposed along the axis of the duct and are covered, except for the tip, with an insulating layer 108. The tips are connected to a seat 109 which is likewise insulated and disposed outside the tube, i.e. on the duct 3.

After a certain period of operation, however, microscopic zinc deposits may remain permanently on the projections, and may ultimately prevent the dendrites from being detached from the projections.

This disadvantage can be obviated simply by periodically dissolving the deposits by short-circuiting the electrodes of the device. The resulting electrochemical cell produces a weak current, but sufficient to dissolve the deposits.

Consequently, the method and device according to the invention are adapted to facilitate the regeneration of zinc particles used inter alia in an electrochemical generator, and may advantageously be applied to electric vehicles.

In a concrete application of the invention an embodiment with the structure of FIGS. 18 and 19 was used. The tube 3 made of polyvinyl chloride has internal and external diameters respectively of 22 mm and 25 mm. The electrode 4 made of sintered nickel is 0.8 mm thick and extends over an arc of 240°. The projections 100, made of magnesium, are cylindrical having a diameter of 1 mm with flat tips as shown in FIG. 8. The regenerator solution is 12N potash containing a zincate solution of concentration between 0.1 and 5 moles/liter. During the zinc particle deposition phase the solution flows at 200 l/h with an electricity consumption of 0.2 Ah per projection. During zinc particle removal phase of 1 minute's duration the solution flows at about 2,000 l/h and the electrodes are short-circuited.

Of course, the invention is in no way limited to the embodiments described and shown, since such embodiments have been given by way of example only. More particularly, details can be modified, some features can be changed, and some means can be replaced by equivalent means without departing from the invention.

Naturally the various features of the several embodiments described can be interchanged without departing from the scope of the invention. In particular any of the negative electrodes described can be adapted to any of the embodiments, likewise any of the positive electrodes and so also any other components or units.

I claim:

1. A device for regenerating zinc from an alkaline zincate solution, said device comprising: a duct, a negative electrode disposed substantially along the axis of said tubular duct, means for conveying said solution for regeneration within said duct, said duct being constructed from a porous insulating hydrophilic material to allow the alkaline solution to infiltrate but preventing zinc particles dissociated from the negative electrode from passing therethrough; a positive electrode disposed in the form of a layer on the outer surface of the tubular duct, said positive electrode being constructed from a porous conductive material containing inter alia nickel to cause oxygen to be released to the exterior; and a layer of a porous water-repellent material containing inter alia porous sintered polytetrafluoroethylene being disposed on the outer surface of the positive electrode, to cause oxygen to be released to the exterior but preventing the solution from seeping therethrough.

2. The device according to claim 1, wherein the negative electrode is a substantially cylindrical bar.

3. The device according to claim 2, wherein the surface of the negative electrode is polished.

4. The device according to claim 2, wherein the surface of the negative electrode is partitioned into conductive regions and insulation regions.

5. The device according to claim 4, wherein the partitions are formed by a cracked layer of insulating material.

6. The device according to claim 4, wherein the partitions are formed by grooves in which an insulating material is deposited.

7. The device according to claim 2, wherein the negative electrode is covered with an insulating layer formed on each side with small apertures, in staggered relationship.

8. The device according to claim 1, wherein the negative electrode has projections, in staggered relationship, made of the same conductive material as the electrode, said projections have ends extending parallel to one another and in the same direction as the flow of solution to be regenerated, the negative electrode being covered with an insulating layer with the projections being at least partially free of said insulating layer.

9. The device according to claim 1, wherein the negative electrode is divided into elements having ends extending parallel to one another and in the same direction as the flow of solution to be regenerated, the elements being each connected to an electric conductor which in turn is connected to a cable disposed against the wall of the tubular duct, and the electric conductors, the cable and the elements being partly covered with an insulating layer.

10. The device according to claim 1, wherein the negative electrode is formed with projections having ends disposed along the axis of the tubular duct and extending parallel to one another and in the same direction as the flow of solution for regeneration, the projections being secured to a seat disposed against the wall of the tubular duct, the seat being covered with an insulating layer and the projections being partly covered, with an insulating layer.

11. The device according to claim 1, wherein the negative electrode has projections having ends disposed along the axis of the tubular duct and extending parallel to one another and in the same direction as the flow of solution to be regenerated, the projections being secured to a seat disposed externally in contact with the layer of water-repellent material, the seat being covered with an insulting layer and the projections being partly covered, with an insulating layer.

12. The device according to claim 1, wherein the positive electrode has a cross-section in the form of an arc of a circle bounded by a center angle of at least 180°, and the bisector of the angle being substantially vertical.

13. The device according to claim 1, wherein the inner surface of the tubular duct is covered with a layer of sealing-tight insulating material having a cross-section in the form of an arc of a circle bounded by a center angle of not more than 180°, and the bisector of the angle being substantially vertical.

14. The device according to claim 1, wherein said tubular duct and said positive electrode both have a cross-section which is a complete circle.

15. The device according to claim 6, wherein said tubular duct has a cross-section which is a complete circle and said positive electrode has a cross-section which is in the form of an arc of a circle extending over an angle of not less than 180° with a bisector substantially vertical.

16. The device according to claim 6, wherein said tubular duct and said positive electrode both have a cross-section which is a complete circle, and a layer of fluid-tight insulating material is disposed on said positive electrode and having a cross-section which is in the form of an arc of a circle extending over an angle of not more than 180° with a bisector substnatially vertical.

17. The device according to claim 6, wherein said tubular duct has a cross-section which is a complete circle, said positive electrode has a cross-section which is in the form of an arc of a circle extending over an angle of not less than 180° with a bisector substantially vertical, said negative electrode being preferably in the form of metallic projections with tips disposed substantially on the axis of said tubular duct, and the projections being connected to a seat disposed in contact with the exterior of said tubular duct and covered in part together with the seat with an insulating layer.

18. The device according to claim 1, wherein said tubular duct has a cross-section which is a complete circle, said positive electrode has a cross-section which is in the form of an arc of a circle extending over an angle of not less than 180° with a bisector substantially vertical, said negative electrode being preferably in the form of metallic projections with tips disposed substantially on the axis of said tubular duct, and the projections being connected to a seat disposed in contact with the exterior of said tubular duct and covered in part together with the seat with an insulating layer.

19. The device according to claim 8 wherein the ends of the projections are tapered.

20. The device according to claim 19, wherein the ends of the projections are substantially flat.

21. The device according to claim 1, wherein the negative electrode is made of a conductive material having a high excess pressure of hydrogen and free from inclusions of elements capable of forming intermetallic compounds with zinc.

22. The device according to claim 21, wherein said negative electrode material contains magnesium.

* * * * *